United States Patent [19]
Liu et al.

[11] Patent Number: 6,139,816
[45] Date of Patent: Oct. 31, 2000

[54] PROCESS FOR THE PREPARATION OF ULTRA-FINE POWDERS OF METAL OXIDES

[75] Inventors: Ru-Shi Liu, Hsinchu Hsien; Shich-Chang Suen, Pingtung Hsien; Yu-Hua Kao, Kaohsiung Hsien, all of Taiwan

[73] Assignee: Merck Kanto Advanced Chemical LTD, Taoyuan Hsien, Taiwan

[21] Appl. No.: 08/871,193

[22] Filed: Jun. 9, 1997

[51] Int. Cl.[7] .................................................. C01G 25/02
[52] U.S. Cl. ..................... 423/608; 423/610; 423/612; 423/615; 423/617; 423/618; 423/624; 502/353; 502/355
[58] Field of Search .................... 423/592, 601, 423/602, 603, 604, 605, 606, 607, 608, 609, 610, 583, 612, 615, 617, 618, 624; 502/300, 353, 355

[56] References Cited

U.S. PATENT DOCUMENTS

| | | | |
|---|---|---|---|
| 4,065,544 | 12/1977 | Hamling et al. | 423/252 |
| 4,548,798 | 10/1985 | Rice | 423/263 |
| 4,622,310 | 11/1986 | Iacobucci | 502/208 |
| 4,842,832 | 6/1989 | Inoue et al. | 423/211 |
| 4,977,109 | 12/1990 | Liu | 505/1 |
| 5,051,393 | 9/1991 | Harrison et al. | 502/304 |
| 5,066,636 | 11/1991 | Liu et al. | 505/1 |
| 5,133,955 | 7/1992 | Raghavan et al. | 423/592 |
| 5,228,910 | 7/1993 | Joyce et al. | 106/450 |
| 5,236,783 | 8/1993 | Aoki et al. | 428/403 |
| 5,391,364 | 2/1995 | Cogliati | 423/335 |

OTHER PUBLICATIONS

Carturan, G. Et al. "Effect of Sn/Sb ratio in determining crystallite size of "SnO2–Sb2O5" semiconductors." Journal of Materials Science, No. 23 (1988) pp. 3156–3160.

Xie, C. Et al. "Characterization of Raman Spectra in Nano–SnO2 Solids." Phys. Stat. Sol. (a) 141, K59, (1994).

Unaogu, A.L.. Et al. "Characterization of Antimony–Doped Tin Oxide Films Prepared by Spray Pyrolysis." Solar Energy Materials, No. 20 (1990) pp. 29–36.

Chatelon, J. P. Et al. "Morphology of SnO2 thin films obtained by the sol–gel technique." Thin Solid Films, No. 247 (1994), pp. 162–168.

Zuo, J. Et al. "Study of the Raman spetrum of nanometer SnO2." J. Appl. Phys., vol. 75, No. 3(Feb. 1994), pp. 1835–1836.

Herman, H. "Powders for Thermal Spray Technology." Kona, No. 9 (1991), pp. 187–199.

*Primary Examiner*—Tom Dunn
*Assistant Examiner*—Cam N. Nguyen
*Attorney, Agent, or Firm*—Ladas & Parry

[57] ABSTRACT

A novel process for the preparation of ultra-fine powders of metal oxide wherein a surfactant is added to the solution for the preparation of the metal oxide to provide nanometer metal oxide powders without the utilization of vacuum or high pressure conditions is disclosed.

9 Claims, 8 Drawing Sheets

PROCESS FOR THE PREPARATION OF ULTRA-FINE POWDERS OF METAL OXIDES

BACKGROUND OF THE INVENTION

The properties of a material are influenced by the surrounding environment and can even vary with its particle size. The surface area of a material will change with its particle size. The properties such as magnetism, electric resistance and optical properties of a material with a smaller particle size will be different from those of the same material with a larger particle size due to the relative difference between their surface area.

It is known that ultra-fine powders of metal oxides are useful in various fields. For example, for catalysts, the application of ultra-fine metal oxide powders can increase the surface area of catalyst; for computers and televisions, the application of ultra-fine metal oxide powders in coating the screen of a computer or a television can provide resistance to electrostatics and reflection; and in chemical mechanical polishing, ultra-fine metal oxide powders can be used as abrasives in the polishing procedure. Various processes for the preparation of metal oxide powders are known in the art. For instance, cracking, physical vapor deposition, chemical vapor deposition, spray pyrolysis, gel method and hydrothermal method have been developed (see, Carturan et al., J. Material Science 23 (1988) 3156; Xie et al., Phys. Stat. Sol. (a) 141, K59 (1994); Unaogu et al., Solar Energy Materials 20 (1990) 29; J. P. Chatelon, Terrier et al., Thin Solid Films, 247 (1994) 162 and Zuo et al., J. Appl. Phys. 75(3), 1 February 1994.) Cracking is simple but cannot provide the desired particle size and distribution because the particles prepared are not uniform. Both physical and chemical vapor depositions have to be conducted under vacuum conditions and require high operation costs. The particles provided by spray pyrolysis are too large to be useful. Gel method can provide a desired particle size but requires high costs because it should start with metal alkoxides which are expensive and easily flammable. Hydrothermal method is a modification of the gel method and has to use a hydrothermal apparatus which should be conducted under high temperature and high pressure conditions. Hydrothermal method can start with metal salts without the shortcomings of the gel method. However, hydrothermal method has the disadvantage of high operation costs for the high temperature and pressure conditions of the hydrothermal apparatus.

Therefore, there is a necessity in the art to provide an economical process for preparing ultra-fine metal oxide powders with desired particle size and particle distribution without the utilization of vacuum or high pressure condition.

SUMMARY OF THE INVENTION

It is an object of the present invention to provide a process for preparing ultra-fine metal oxides without the application of high temperature and high pressure. According to the present invention, ultra-fine metal oxide powders with good quality can be prepared by way of the utilization of a surfactant.

It is another object of the present invention to provide metal oxide powders in the order of nanometer without the application of flammable starting materials or a high temperature-pressure apparatus.

The present invention relates to a process for preparing ultra-fine metal oxide powders comprising adding a surfactant to a metal compound solution and heating and calcining the gels and/or precipitates formed therefrom to provide metal oxide powders in the order of nanometer.

These and other objects, advantages and features of the present invention will be more fully understood and appreciated by reference to the written specification.

DETAILED DESCRIPTION OF THE INVENTION

The present invention provides a process for the preparation of ultra-fine metal oxide powders, especially metal oxide powders in the order of nanometer comprising the steps of:

(i) providing an aqueous solution of metal compound comprising a metal moiety corresponding to the metal moiety of the metal oxide;

(ii) providing a surfactant;

(iii) mixing the metal compound solution and the surfactant to form gels and/or precipitates; and (iv) heating and calcining the gels and/or precipitates.

In the process of the present invention, the metal moiety of the metal compound should be that of the desired metal oxide. The metal compounds can be in any type known in the art suitable for preparing metal oxides. For example, but not limited to, the metal compound can be a salt or an alkoxide. A salt is preferred because it is more economic and can avoid the problems caused by flammable alkoxides. Examples of metal salts for preparing metal oxide powders are such as, but not limited to, silicate (for preparing $SiO_2$ powders), the chlorides of antimony and stannum (for preparing $Sb_2O_5$ and $SnO_2$ powders respectively). Upon appropriate control, the process of the present invention can provide any desired metal oxides powders. Examples of the species of the super-fine metal oxide powders are $SnO_2$, $Al_2O_3$, $SiO_2$, $CeO_2$, $ZrO_2$, $TiO_2$, $In_2O_3$, $Ru_2O_3$, $Sb_2O_5$ and $V_2O_5$.

The use of a surfactant is critical to the process of the present invention. Without the limitation of theory, it is believed that the addition of surfactant primarily changes the physical morphology of metal oxide during the preparation. For example, the formation of metal oxides in hydrothermal method comprises two stages: a hydrolysis stage and a condensation stage. Metal salts are hydrolyzed into corresponding oligomer intermediates and then the intermediates condense into metal oxide condensates. The metal oxide condensates are then heated to remove solvent and calcined at high temperature to provide desired metal oxide powders. The addition of a surfactant in the process of the present invention is to change the physical morphology of the condensates.

Figure 1:
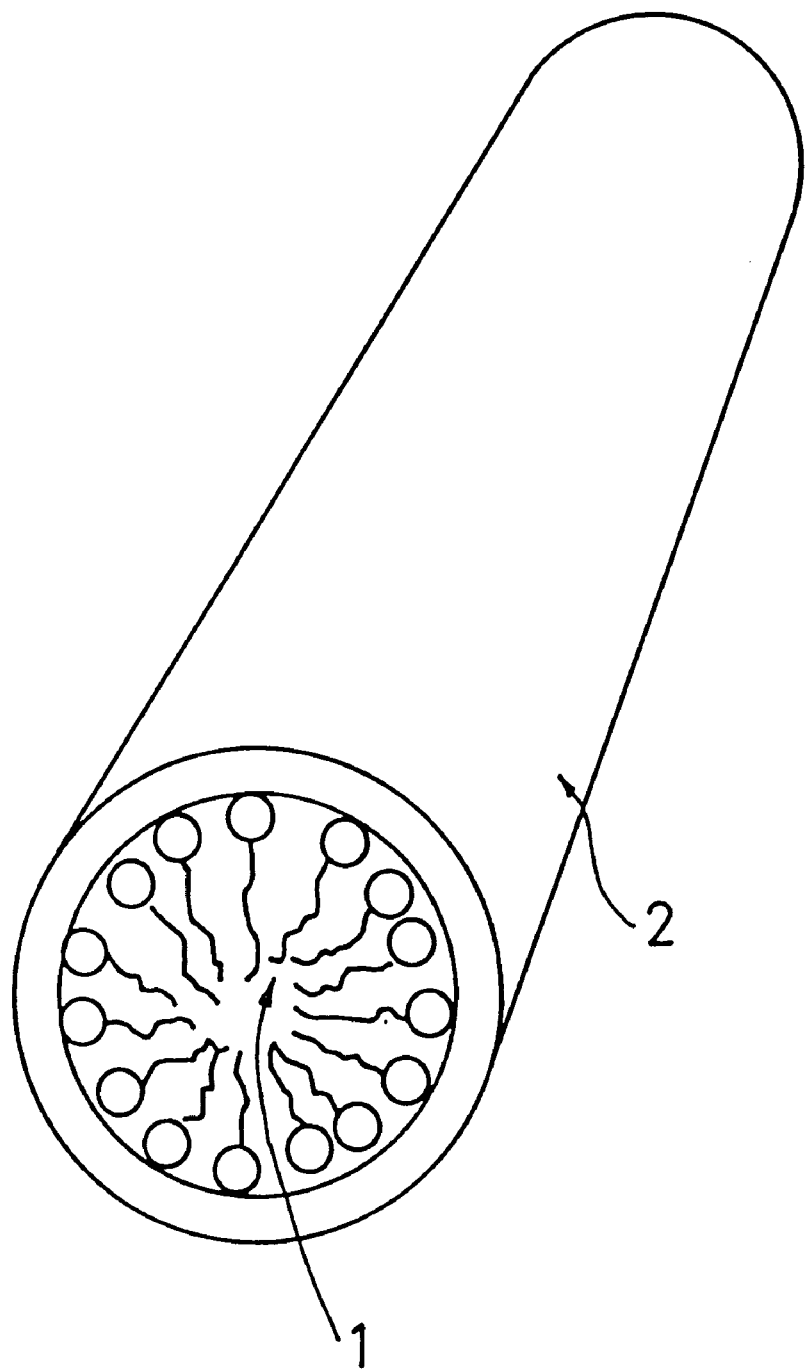
FIG. 1 shows a combination of surfactant and metal oxide formed during the process of the present invention wherein 1 represents a micell of surfactant and 2 represents a metal oxide shell.

It is known that a surfactant has a hydrophilic end and a hydrophobic end. In an aqueous solution, hydrophobic ends will gather and hydrophilic ends will bind to water and thus the micells of surfactant will form. In the process of the present invention, the metal oxide at condensation stage will be propped open by the micell of surfactant and form a metal oxide shell surrounding the micell. FIG. 1 shows a specific combination of surfactant and metal oxide formed during the process of the present invention, wherein 1 represents the rod micell of surfactant and 2 represents the metal oxide shell.

Without the limitation of theory, it is believed that the driving force for binding metal oxide to surfactant is the Coulombian force between the metal oxide and the surfactant. Specifically, when the metal compound for preparing metal oxide provides a metal moiety having positive charge (s) in solution, anionic surfactants such as dococyl phosphonate, cetyl sulfonate, sodium dioctyl sulfosuccinate, sodium stearate and sodium lauryl sulfate are suitable; when the metal moiety having negative charge(s) in solution, cationic surfactants such as cetyltrimethylammonium chloride, cetyltrimethylammonium bromide, cetyltrimethylammonium hydroxide, doctyltrimethylammonium chloride, doctyltrimethylammonium bromide and doctyltrimethylammonium hydroxide are suitable; when the metal moiety is neutral in solution, neutral surfactants such as polyethylene oxide, polypropylene oxide and hexadecylamine are appropriate. In other words, the selection of surfactant depends on the charge type of the metal moiety of used metal compound in solution. Gels or precipitates will not form unless the charge types of the metal moiety and the surfactant meet the aforementioned requirements. In the process of the present invention, the surfactant can be a single surfactant, or a mixture of surfactants.

The amount of surfactant used in the process of the present invention can vary in a wide range with the proviso that the amount of surfactant is not up to the extent that a metal oxide shell cannot form around the surfactant micell. In the process of the present invention, it is preferred that the molar ratio of surfactant to metal compound is less than 20:1, more preferred is less than 10:1 and most preferred is 5:1, especially 0.5:1.

During the mixing of the metal compound solution and surfactant, any operations disadvantageous to the formation of gels or precipitates (e.g. stirring) should be avoided. It is preferred that the mixture of the solution of metal compound and surfactant is left to stand for a period of time to facilitate the aggregation of gels or precipitates. The formed gels or precipitates are then directly collected by such as filtration with suction. As known in the art, the collected gels or precipitates should not contain any $Cl^-$ when metal chlorides are used in the preparation of metal oxide powders and this can be ensured by any conventional ways. For instance, a solution of $AgNO_3$ can be used to determine whether the gels or precipitates contain any residual $Cl^-$. If necessary, the gels or precipitates should be washed several times with deionized water to remove any residual $Cl^-$. In an embodiment of the present invention, the solution containing formed gels or precipitates is left to stand for a period until the upper clear phase is formed, the upper clear phase is repeatedly replaced with deionized water until no $Cl^-$ can be detected by a $AgNO_3$ solution and then the solution is filtrated with suction to collect the gels or precipitates.

Thereafter, the collected gels or precipitates are heated and calcined, wherein the solvent is first removed and then the surfactant is removed to leave metal oxide shells. Finally, the shells crash and form ultra-fine metal oxide powders. It is preferred that the heating and calcining are operated separately, the solvent adhering to gels or precipitates are first removed by a drying operation and the residual is put in a high temperature oven to remove the surfactant micells and to crash the metal oxide shells to obtain metal oxide powders. In other words, it is preferred that the calcining operation is carried out at a temperature up to that being able to remove the surfactant. Generally, 500° C. can completely remove most suitable solvents. For instance, when $SnCl_4$ and $NaO_3SCH(COOC_8H_{17})CH_2COOC_8H_{17}$ are used to prepare ultra-fine $SnO_2$ powders, $NaO_3SCH(COOC_8H_{17})CH_2COOC_8H_7$ can be completely removed by calcining at about 400° C.

The following examples are offered by way of illustration. The examples are not intended to be limit the scope of the invention in any respect and should not be so construed.

EXAMPLES

Example 1

3.2900 g of $SnCl_4.5H_2O$ were dissolved in 10.0 ml of water. 2.6000 g of $NaO_3SCH(COOC_8H_{17})CH_2COOC_8H_{17}$ were added to 190 ml of water under heating and stirring until completely dissolved and then the solution was cooled at room temperature. The solution of $SnCl_4.5H_2O$ was mixed with the solution of $NaO_3SCH(COOC_8H_{17})CH_2COOC_8H_{17}$ and a gelled solution of white precipitates was obtained. The gelled solution was left to stand for 24 h, and then the upper clear phase was repeatedly replaced with deionized water and the lower precipitate phase was filtrated with suction to remove any residual $Cl^-$ until no $Cl^-$ can be detected by a solution of $AgNO_3$. The collected precipitates were dried in an oven. The dried precipitates were put in a high temperature oven for the heat treatment and the temperature of the oven was increased at a rate of 5° C./min to 200° C. to calcine the precipitates for 6 h and then cooled the oven at a rate of 5° C./min to room temperature to obtain $SnO_2$ powders.

Repeating the above heat treatment procedures with the exception that the temperature of the oven was increased to 400° C., 600° C. and 800° C. respectively to obtain $SnO_2$ powders.

Figure 2:
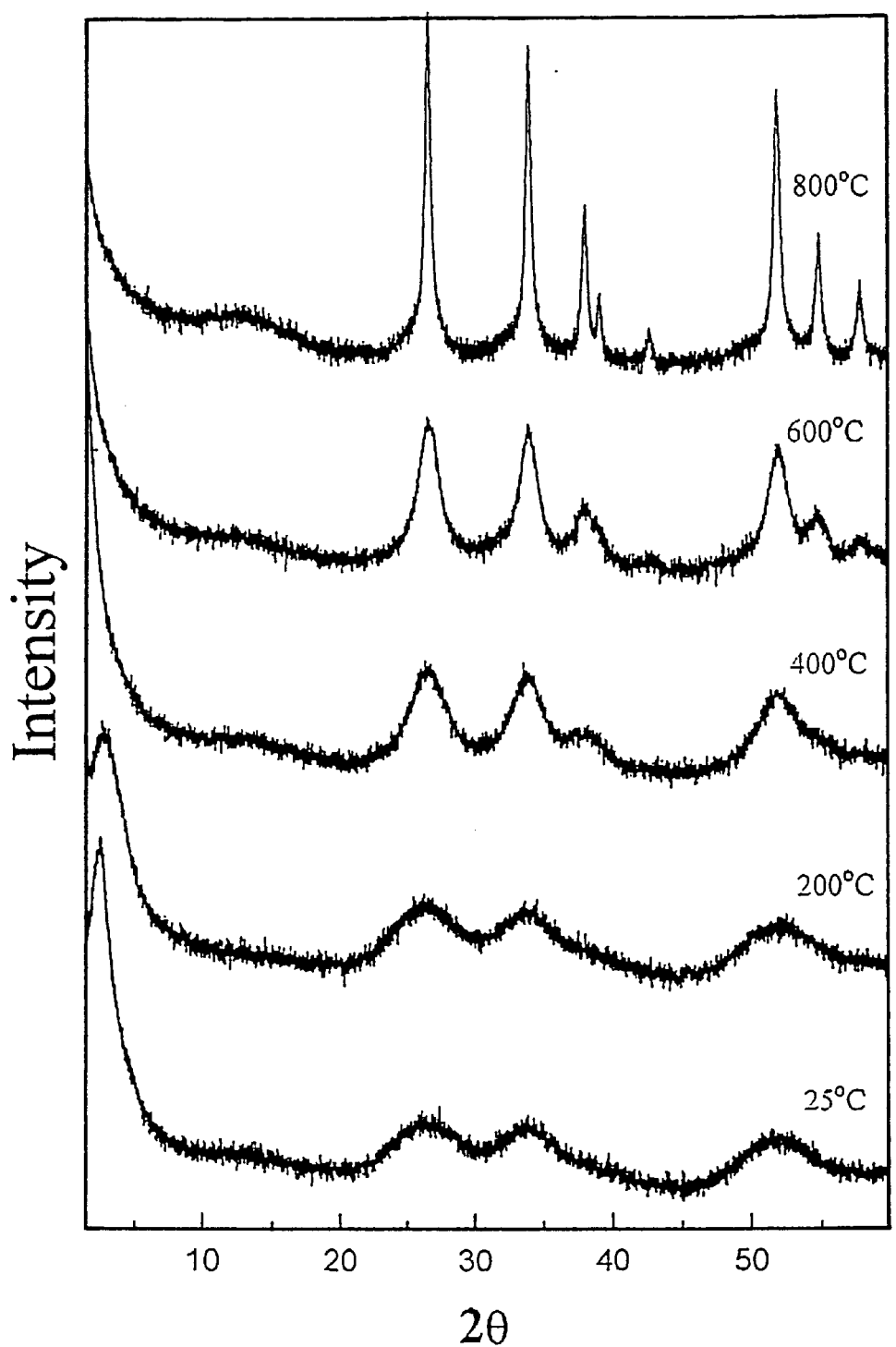
FIG. 2 shows the x-ray diffraction patterns of $SnO_2$ powders prepared by the process of the present invention under different calcining temperatures.

The crystal structure of $SnO_2$ powders were determined by an x-ray diffractometer and the results were shown in FIG. 2. In FIG. 2, the ordinate represents the intensity and the abscissa represents the Bragg angle (2Θ) of x-ray diffraction pattern. As shown in FIG. 2, the powders obtained at room temperature (25° C.) had a relatively strong peak at low angle (2Θ is about 2.4°) which corresponded to someone crystal structure. By way of electron microcopy, it was observed that the peak was resulted from the rod surfactant micells (as shown in FIG. 1). This demonstrated that, during the process of the present invention, the prepared metal oxide adhered to the surface of surfactant micell.

Further, it was observed that the intensity of the low angle diffraction peak decreased with the increase of calcining temperature and this was because the surfactant was gradually removed and the shell of $SnO_2$ gradually crashed. When the calcining temperature was up to 400° C., the surfactant was completely removed and shell of $SnO_2$ completely crashed to small pieces and no low angle (2Θ is about 2.4°) diffraction peak was observed. Instead of the low angle diffraction peak, another peak corresponding to the crystals of $SnO_2$ powders (2Θ is 22°–55°) was observed and its intensity increased with the increase of calcining temperature.

Figure 3A:
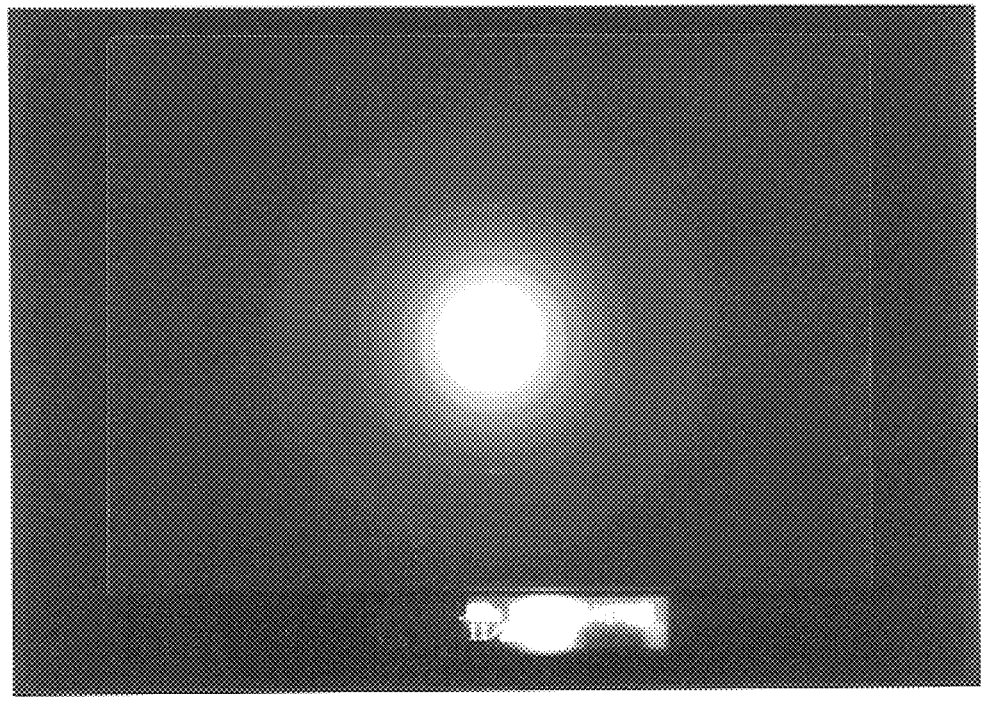
FIGS. 3(a), 3(b) and 3(c) show the electron microscopic diffraction patterns of $SnO_2$ powders prepared by the process of the present invention and calcined at 200, 400 and 800° C. respectively.
Figure 3B:
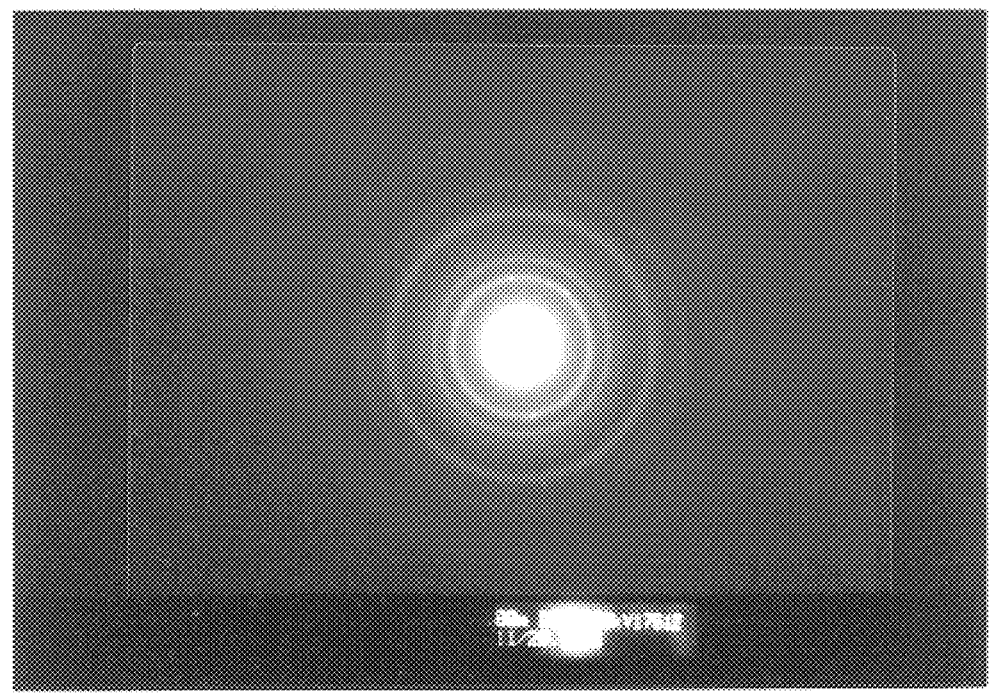
Figure 3C:
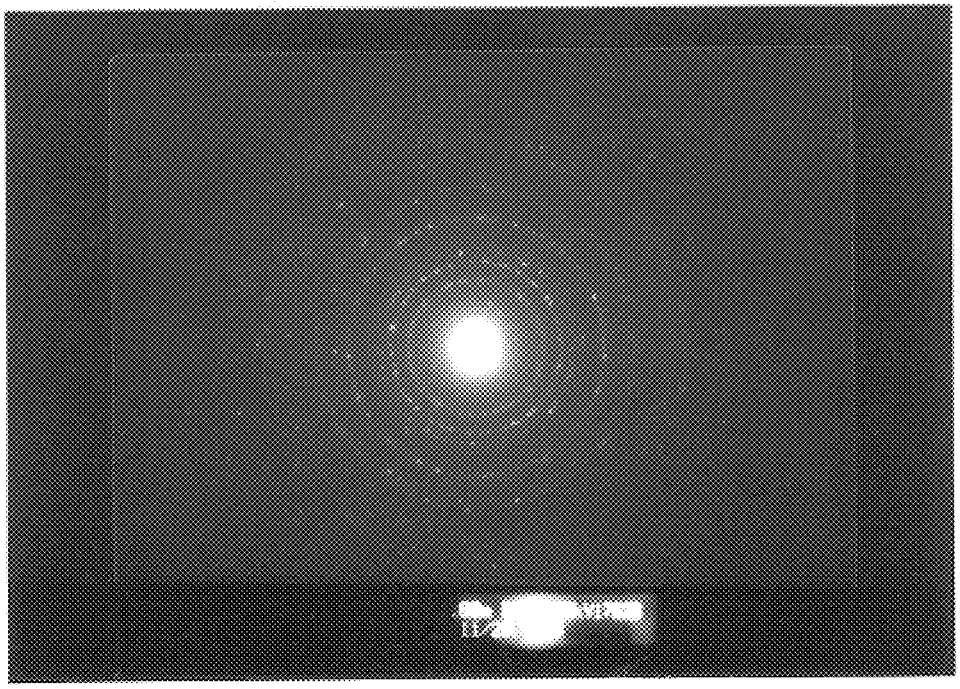

The above phenomena that the crystals of $SnO_2$ was gradually distinct can be further demonstrated by the electron diffraction patterns of $SnO_2$ powders. FIGS. 3(a), 3(b) and 3(c) were the diffraction patterns of $SnO_2$ powders at 200, 400 and 800° C. respectively. As shown in FIGS. 3(a), 3(b) and 3(c), the diffraction pattern at 200° C. was a circular diffraction which corresponded to amorphous structure; the diffraction patterns at 400° C. and 800° C. contained diffraction points and the number of diffraction points increases with the calcining temperature and the crystal structure is gradually distinct.

From the x-ray diffraction patterns, the particle size of metal oxide powders can be calculated from Sherrer Equation as below:

$$d = k\,\lambda/\beta\,\cos\Theta$$

wherein d is the particle size, k is shape factor, λ is the wave length of x-ray (here, the value of λ of $CuK_\alpha$ is 1.5418 Å), Θ is the Bragg angle (here, 2Θ=33.9°), is half of the height of the diffraction peak (at 2Θ=33.9°). The results were shown in Table 1.

TABLE 1

| calcining temperature (°C.) | particle size (nm) |
|---|---|
| 25 | 2.6 |
| 200 | 2.7 |
| 400 | 5.2 |
| 600 | 8.1 |
| 800 | 26.0 |

It was noted from Table 1 that the particle size was increased with increase calcining temperature. Nevertheless, even though the calcining temperature was up to 800° C., the particle size of obtained powders was 26.0 nm. The particle size of powders can be only 5.2 nm as the calcining temperature is merely 400° C. at which the surfactant can be completely removed.

Figure 4A:
FIGS. 4(a), 4(b) and 4(c) show the electronic microscopy pictures of $SnO_2$ powders prepared by the process of the present invention and calcined at 200, 400 and 800° C. respectively.
Figure 4B:
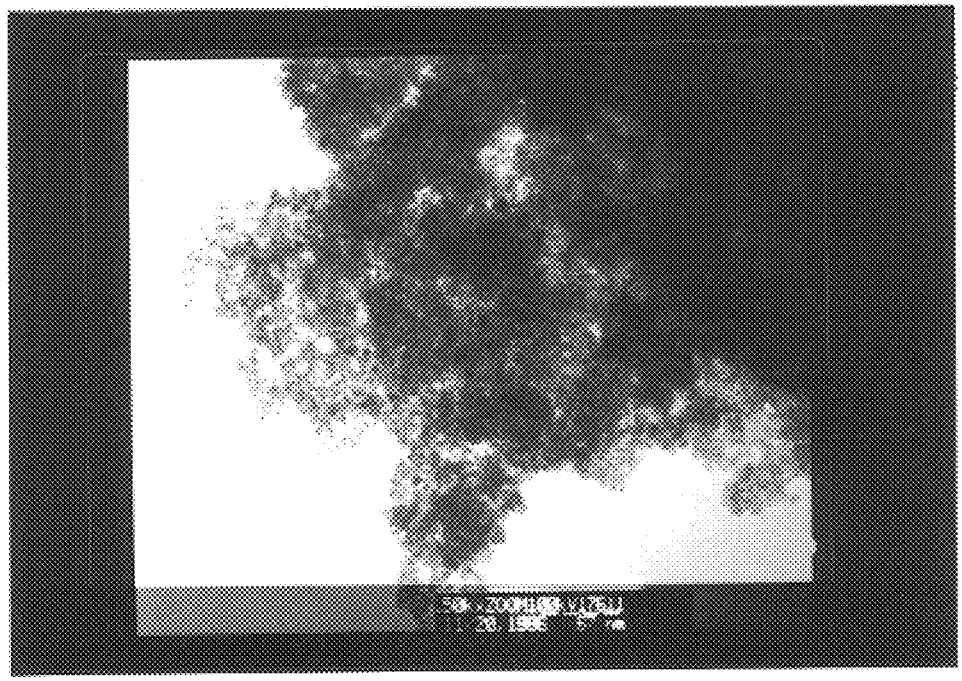
Figure 4C:
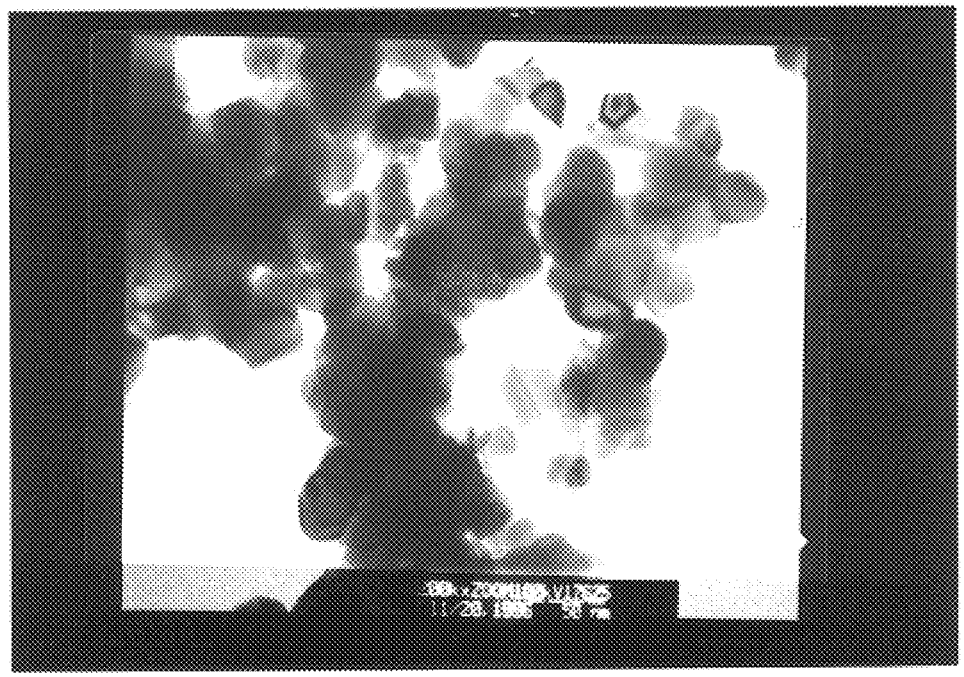

The average particle size of metal oxide powders can be directly determined by electron microscope. FIGS. 4(a), 4(b) and 4(c) were the photos of powders calcined at 200° C. (enlarge 1.5×10⁵ times), 400° C. (enlarge 1.5×10⁵ times), and 800° C. (enlarge 2×10⁵ times) respectively. Many holes can be observed in FIG. 4(a) and they correspond to the position of surfactant. When the surfactant was completely removed, the shells of metal oxide completely crashed (as shown in FIG. 4(b)). When higher calcining temperature was used, distinct crystals can be observed (FIG. 4(c)). From the photos, the particle size of powders obtained at a calcining temperature of 800° C. can be directly determined and was about 30 nm, which is close to the average particle size predicted from the corresponding x-ray diffraction pattern by Sherrer Equation. This demonstrates that the process of the present invention can provide super-fine powders in the order of nanometer.

Comparative Example C-1

This example illustrates the preparation of $SnO_2$ powders by conventional hydrothermal method.

8.7876 g of $SnCl_4 \cdot 5H_2O$ were dissolved in 100.0 ml of water, and, 2.1 ml of 12M $HNO_3$ were added to obtain a solution with a molar ratio of $HNO_3$ to $SnCl_4$ being 1:1. 80 ml of the solution were put in a thermal bomb and the thermal bomb was heated in a high temperature oven at 150° C. for 12 h, and then cooled to room temperature and white precipitates formed. The precipitates were repeatedly washed with deionized water and filtrated with suction until no $Cl^-$ can be detected by a solution of $AgNO_3$. The precipitates were then dried and put in a high temperature oven and the temperature of the oven was increased at a rate of 5° C./min to 200° C. to calcine the precipitates for 6 h and then cooled the oven at a rate of 5° C./min to room temperature to obtain $SnO_2$ powders.

Repeating the above procedures with the exception that the temperature of the high temperature oven was increased to 400° C., 600° C. and 800° C. respectively to obtain $SnO_2$ powders.

Figure 5:
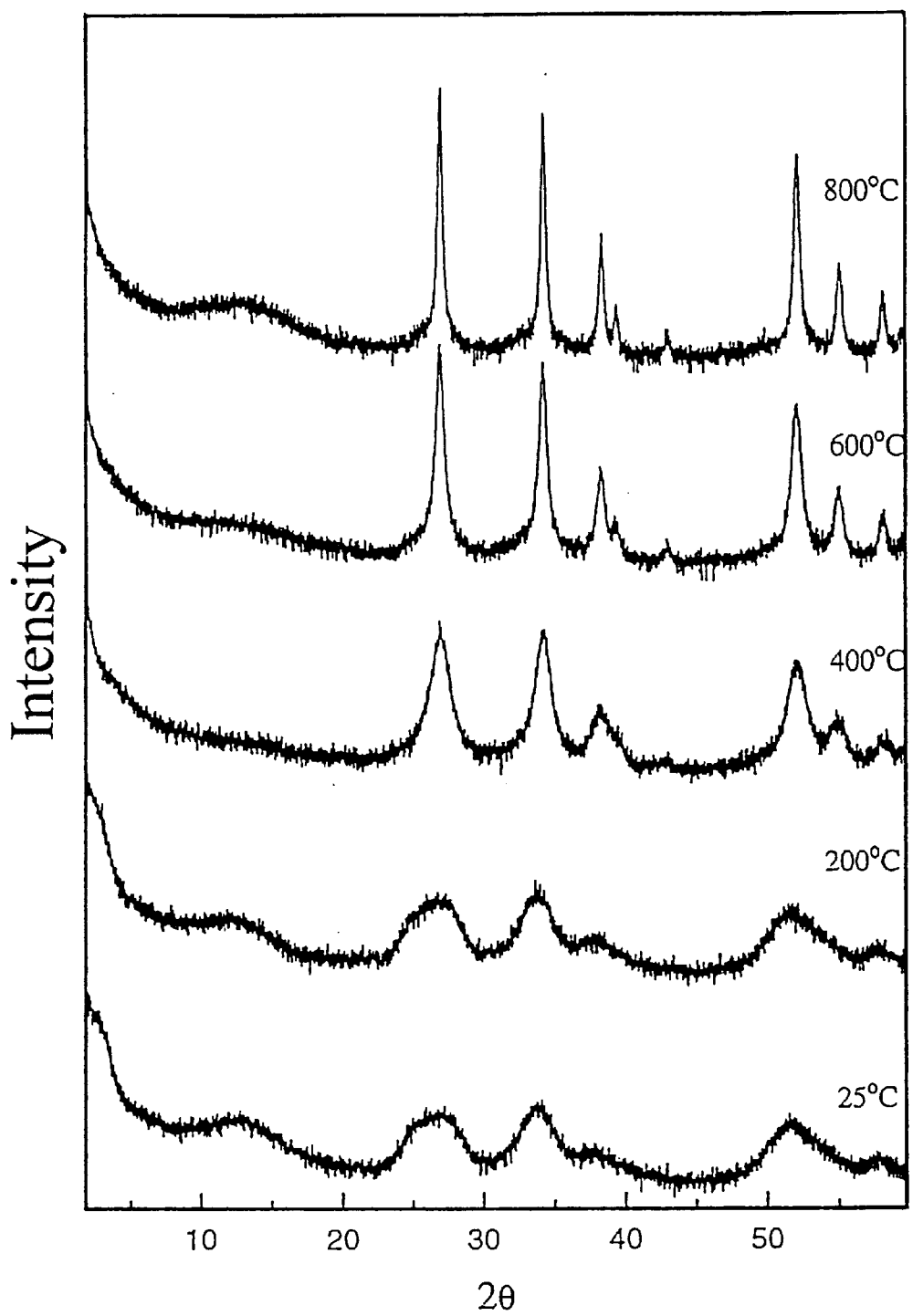
FIG. 5 shows the x-ray diffraction patterns of $SnO_2$ powders prepared by hydrothermal method under different calcining temperatures.

FIG. 5 shows the x-ray diffraction patterns of $SnO_2$ powders under different calcining temperatures. A comparison of FIG. 2 to FIG. 5 reveals that the x-ray diffraction patterns of the metal oxide powders prepared by hydrothermal method at low temperature (i.e. room temperature and 200° C.) are almost the same as those of the metal oxide powders prepared by the process of the present invention with the exception that the former do not have the characteristic diffraction peak at low angle. This demonstrated that the crystal type of the $SnO_2$ powders prepared by the process of the present invention is the same as that prepared by hydrothermal method. Also, Sherrer Equation was used to predict the particle size of the powders prepared by hydrothermal method and the results were shown in Table 2:

TABLE 2

| calcining temperature (°C.) | particle size (nm) |
|---|---|
| 25 | 5.7 |
| 200 | 8.5 |
| 400 | 13.8 |
| 600 | 27.8 |
| 800 | 54.7 |

Figure 6:
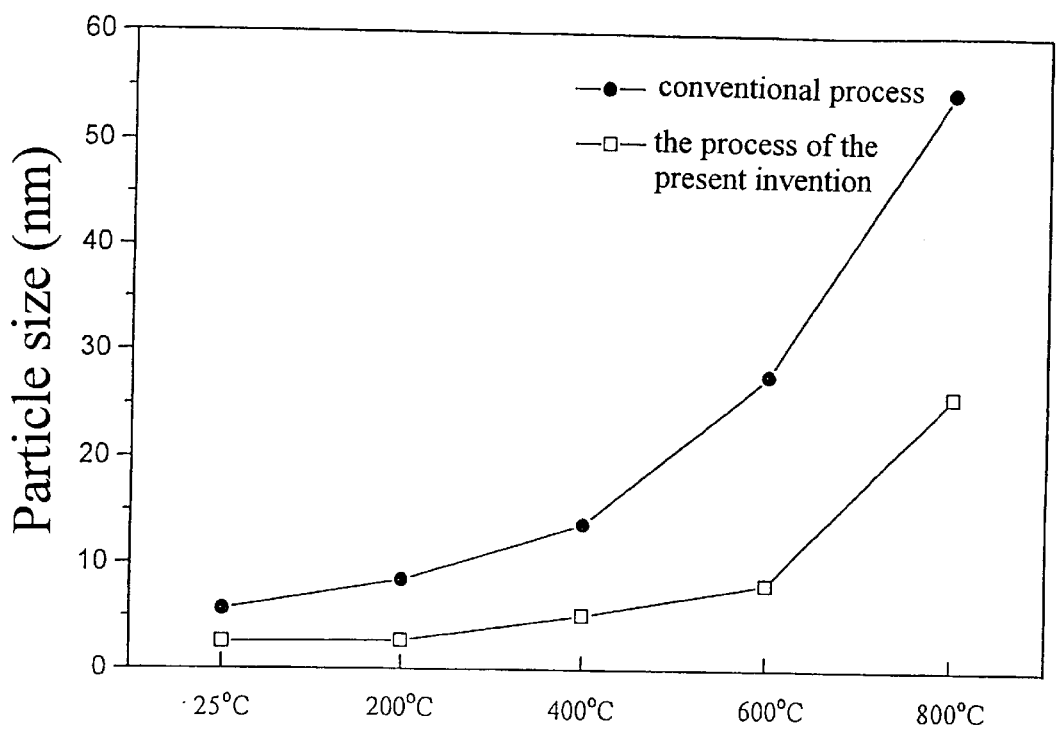
FIG. 6 shows the plots of the particle size of $SnO_2$ powders prepared by hydrothermal process and by the process of the present invention under different calcining temperatures.

A comparison of Table 1 and Table 2 reveals that, at the same temperature, the process of the present invention can provide metal oxide powders whose particle size is smaller than that of the metal oxide powders prepared by hydrothermal method without the use of a hydrothermal apparatus. FIG. 6 shows the plots of the particle size of $SnO_2$ powders and calcining temperature shown in Tables 1 and 2. From FIG. 6, it is apparent that the process of the present invention can provide metal oxide powders with a desired particle size at a lower temperature.

Examples 2~4

Figure 7:
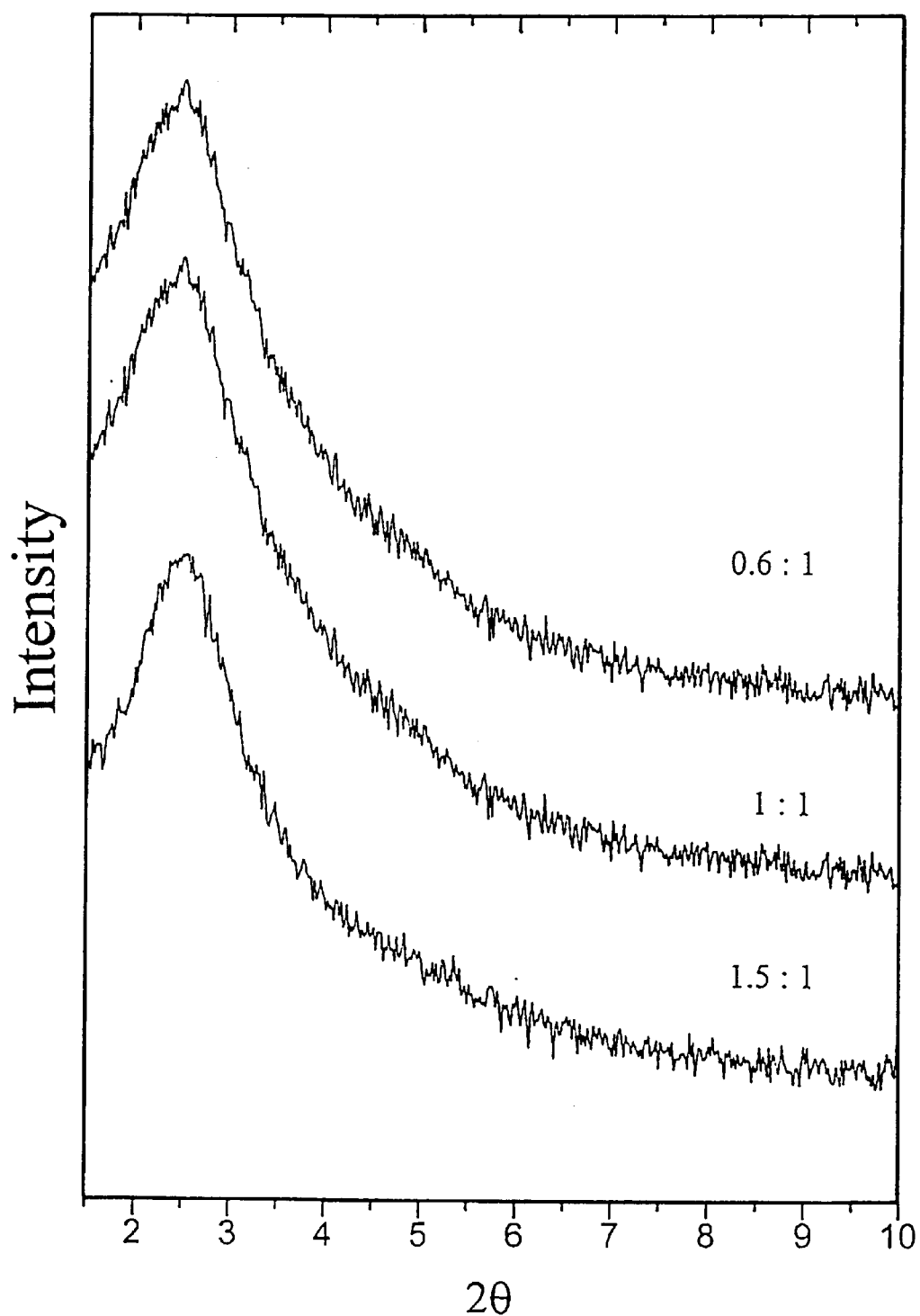
FIG. 7 shows the x-ray diffraction patterns of the metal oxide powders prepared by the process of the present invention at different molar ratios of surfactant to metal compound.

The procedures of Example 1 were repeated but $SnCl_4 \cdot 5H_2O$ and $NaO_3SCH(COOC_8H_{17})CH_2COOC_8H_{17}$ were added at the amount that the molar ratios of $SnCl_4 \cdot 5H_2O$ to $NaO_3SCH(COOC_8H_{17})CH_2COOC_8H_{17}$ were 1:0.6, 1:1 and 1:1.6. The x-ray diffraction patterns of metal oxide powders obtained at room temperature and at different molar ratios were shown in FIG. 7. As shown in FIG. 7, the metal oxide powders obtained at each molar ratio had a diffraction peak at low angle (2Θ is about 2.4°). In other words, in each case, metal oxide shells formed around the surface of rod surfactant micelles and can provide the desired ultra-fine $SnO_2$ powders.

Example 5

5.3 g of $Na_2SiO_4$ were dissolved in 10 ml of water. An appropriate amount of cetyltrimethylammonium bromide ($C_{16}$TMBA) was added to water under heating and stirring to prepare a 12% solution. The solution of $Na_2SiO_4$ was mixed with 30 ml of the solution of $C_{16}$TMBA and the mixture was left to stand. Thereafter, the precipitates were collected by filtration with suction. The collected precipitates were dried and then put in a high temperature oven and the temperature of the oven was increased at a rate of 5° C./min to 600° C. to calcine the precipitates for 6 h to remove the surfactant and calcine the metal oxide shells to obtain ultra-fine powders with a particle size of about 30 nanometer.

As shown in the examples, the process of the present invention can provide ultra-fine metal oxide powders without the utilization of a high temperature and pressure hydrothermal apparatus or metal alkoxides and can satisfy the need of easy processing, low cost and suitable for mass-production.

What is claimed is:

1. A process for the preparation of ultra-fine powders of a metal oxide comprising a metal moiety that has a charge in aqueous solution that is positive, negative or neutral, said process consisting essentially of:
   (a) mixing together components consisting essentially of (i) water as a solvent, (ii) a salt comprising a metal moiety that is the same as the metal moiety of the metal oxide and (iii) a surfactant, said salt and said surfactant being selected and being mixed with the water in respective amounts so as to form a gelled solution comprising a gel or precipitate of the metal oxide, the surfactant being (i) anionic, if the charge is positive, (ii) cationic, if the charge is negative and (iii) neutral, if the charge is neutral, and the surfactant being present in the gelled solution as a micell with the metal oxide forming a shell surrounding said micell;
   (b) recovering the gel or precipitate from the gelled solution; and
   (c) heating and calcining the gel or precipitate for respective times sufficient for removing residual solvent and surfactant and for forming said ultra-fine powders.

2. A process as claimed in claim 1, wherein the charge of the metal moiety in aqueous solution is positive and the surfactant is an anionic surfactant selected from the group consisting of dococyl phosphonate, cetyl sulfonate, sodium dioctyl sulfosuccinate, sodium stearate, sodium lauryl sulfate and mixtures thereof.

3. A process as claimed in claim 1, wherein the charge of the metal moiety in aqueous solution is negative and the surfactant is a cationic surfactant selected from the group consisting of cetyltrimethylammonium chloride, cetyltrimethylammonium bromide, cetyltrimethylammonium hydroxide, and mixtures thereof.

4. A process as claimed in claim 1, wherein the charge of the metal moiety in aqueous solution is neutral and the surfactant is a neutral surfactant selected from the group consisting of polyethylene oxide, polypropylene oxide, hexadecylamine and mixtures thereof.

5. A process as claimed in claim 1, wherein the molar ratio of the surfactant to the salt is at least 0.6:1 and less than 10:1.

6. A process as claimed in claim 1, wherein the salt is a chloride and the surfactant comprises at least one anionic surfactant.

7. A process as claimed in claim 1, wherein the metal moiety is selected from the group consisting of Sn, Al, Si, Ce, Zr, Ti, In, Ru, Sb, and V.

8. A process as claimed in claim 7 further comprising a step (d) of cooling said ultra-fine powders formed in step (c).

9. A process for the preparation of ultra-fine powders of a metal oxide comprising a metal moiety that has a charge in aqueous solution that is positive, negative or neutral, said process consisting essentially of:
   (a) mixing together components consisting essentially of (i) water as a solvent, (ii) a salt comprising a metal moiety that is the same as the metal moiety of the metal oxide and selected from the group consisting of Sn, Al, Si, Ce, Zr, Ti, In, Ru, Sb and V, and (iii) a surfactant, said salt and said surfactant being selected and being mixed with the water in respective amounts so as to form a gelled solution comprising a gel or precipitate of the metal oxide, the surfactant being (i) anionic, if the charge is positive, (ii) cationic, if the charge is negative and (iii) neutral, if the charge is neutral, and the surfactant being present in the gelled solution as a micell with the metal oxide forming a shell surrounding said micell;
   (b) recovering the gel or precipitate from the gelled solution;
   (c) heating and calcining the gel or precipitate for respective times sufficient for removing residual solvent and surfactant and for forming said ultra-fine powders; and
   (d) cooling said ultra-fine powders formed in step (c).

* * * * *